United States Patent [19]

Grimm

[11] Patent Number: 5,708,132

[45] Date of Patent: Jan. 13, 1998

[54] METHOD FOR THE PRODUCTION OF NITRILE RUBBER

[75] Inventor: Donald Charles Grimm, Akron, Ohio

[73] Assignee: The Goodyear Tire & Rubber Company, Akron, Ohio

[21] Appl. No.: 691,160

[22] Filed: Aug. 1, 1996

[51] Int. Cl.$^6$ .................................................. C08F 6/22
[52] U.S. Cl. ........................ 528/487; 528/497; 526/339; 526/340.1; 526/342
[58] Field of Search .................................. 528/487, 497; 526/339, 340.1, 342

[56] References Cited

U.S. PATENT DOCUMENTS 3,714,087  1/1973  Buchanan et al. ..................... 524/36

*Primary Examiner*—Thomas R. Weber
*Attorney, Agent, or Firm*—Alvin T. Rockhill

[57] ABSTRACT

Nitrile rubber can be synthesized by copolymerizing acrylonitrile and 1,3-butadiene in an aqueous emulsion. After these monomers have been polymerized, it is, of course, necessary to recover the polymer from the aqueous emulsion. The present invention discloses an improved method for the recovery of nitrile rubber from a nitrile rubber containing emulsion, said method comprising the steps of (1) adding an antioxidant to the nitrile rubber containing emulsion to produce a stabilized nitrile rubber emulsion, (2) adding a salt and an acid to said stabilized nitrile rubber emulsion to produce a coagulated nitrile rubber slurry, wherein said coagulated nitrile rubber slurry is comprised of serum and nitrile rubber crumb, (3) separating the nitrile rubber crumb from the serum in the coagulated nitrile rubber slurry, (4) mixing the nitrile rubber crumb into wash water to produce a nitrile rubber reslurry, (5) adjusting the pH of the nitrile rubber reslurry so as to be within the range of about 5 to about 8, and (6) separating the nitrile rubber crumb from the wash water of the nitrile rubber reslurry. Nitrile rubber which is recovered from emulsions utilizing this technique typically exhibits improved stability and cure characteristics.

19 Claims, No Drawings

METHOD FOR THE PRODUCTION OF NITRILE RUBBER

FIELD OF THE INVENTION

The invention relates generally to the production of a raw rubber crumb. More specifically, the invention relates to the production of uncured rubber crumb which may later be vulcanized to form any number of rubber products such as automotive parts, industrial products, household tools and utensils, as well as insulating and structural foams.

BACKGROUND OF THE INVENTION

Synthetic rubbers which can be used in the manufacture of numerous products are commonly produced by emulsion polymerization. In forming polymers by emulsion polymerization, it is often essential to control the molecular weight, crosslinking and branching of the finished polymer in order to produce a polymer having predictable and desired performance characteristics. For instance, the ability to form a useful vulcanized article can depend on control of parameters such as polymer molecular weight and polymer uniformity.

When provided as an unvulcanized polymer, the rubber or elastomer may take any number of forms which facilitate processing to a vulcanized finished product. The unvulcanized polymer may be provided in crumb form, in bale form, solid block or cube form or any number of other forms which serve the customer.

While the form of the unvulcanized rubber or elastomer may be important in satisfying the needs of the final processor, other processing constraints are also critical. Among these constraints are those processing parameters which affect the chemical and physical uniformity of the unvulcanized rubber.

One problem which may occur with unvulcanized rubbers or elastomers is additional, unintended crosslinking during storage and before vulcanization. This added, undesirable crosslinking is commonly referred to as "gelling." One theory about this continued crosslinking or gelling is that a surplus of free radicals remaining from the initial polymerization promotes the undesired additional reactions.

Efforts have been made to counter gel formation in polymers. One of the most widely practiced methods involves the addition of antioxidants to the polymer. It is a common practice to add shortstops to polymer emulsions (latex) and to subsequently strip unreacted monomers from the emulsion followed by the addition of an antioxidant. Antioxidants can counter the formation of gel by reducing the level of free radicals present. Preferably, the antioxidant should provide protection for up to or over a year after formation of the polymer, and even more preferably for two or more years after formation of the polymer.

The choice of an appropriate commercial antioxidant can be very difficult. The antioxidant should have chemical and physical properties appropriate for the intended final use of the polymer. The antioxidant should also be available in sufficient quantities and at a price to make commercial production viable. Other concerns include regulatory or governmental approval for the final use of the product. The class of antioxidants known as alkylated aryl phosphites is favored even though such antioxidants have the disadvantage of hydrolyzing and thus losing their antioxidant behavior.

Additional problems can also result from salt-acid coagulation techniques used to recover emulsion rubbers from the emulsions in which they were synthesized. Residual acid which remains in the polymer after coagulation can present significant problems, including increases in the corrosivity of the polymer. The presence of acid in the polymer can also adversely affect vulcanization rates. Polymers which are at a low pH typically vulcanize at a slower rate than polymers which are of a neutral to alkaline pH. This diminished rate of vulcanization is undesirable because it increases the time required to cure the rubber which is frequently the bottleneck in commercial operations. Uncertainty also arises, at least in part, from the fact that the amount of acid added to coagulate emulsions can vary. This variation in acid level in various rubber batches can result in variations in the rubber cure rate from batch to batch.

Efforts have been made to improve the emulsion polymerization processes for elastomers and rubbers to produce a better polymer. For example, Japanese Patent No. 49,066,725 discloses gel inhibitors that are obtained by mixing solid phenylenediamine derivatives with liquid reaction products derived from aromatic amines and acetone.

U.S. Pat. Nos. 3,984,372 and 4,168,387 disclose esters of polyphenols as polymerizable or built-in antioxidants. The compounds of these two U.S. patents are reaction products of a polyphenolic compound with an ester-forming compound. These patents disclose the use of compounds such as 2-(2-hydroxy-3-tert-butyl-5-methylbenzyl)-4-methyl-6-tert-butyl phenyl methacrylate as polymerizable antioxidants for polymeric compositions.

A need remains for a process by which the stability and uniformity of a polymer may be enhanced easily and in a cost-effective manner.

SUMMARY OF THE INVENTION

Nitrile rubber can be synthesized by copolymerizing acrylonitrile and 1,3-butadiene in an aqueous emulsion. Such emulsion polymerization techniques are widely used in the commercial production of nitrile rubbers. After the nitrile rubber has been prepared, it is, of course, necessary to recover it from the aqueous emulsion. The nitrile rubber is typically recovered from the emulsion by coagulation.

Coagulation is normally accomplished by adding a salt and an acid to the emulsion. A portion of the acid used in coagulating the emulsion typically remains in the rubber crumb which is recovered. The presence of this acid in the dry rubber can lead to polymer instability and can inhibit cure during subsequent vulcanization.

By utilizing the techniques of this invention, nitrile rubber which exhibits improved stability and cure characteristics can be prepared. This invention more specifically discloses an improved method for the recovery of nitrile rubber from a nitrile rubber containing emulsion, said method comprising the steps of (1) adding an antioxidant to the nitrile rubber containing emulsion to produce a stabilized nitrile rubber, (2) adding a salt and an acid to said emulsion of stabilized rubber to produce a coagulated nitrile rubber slurry, wherein said coagulated nitrile rubber slurry is comprised of serum and nitrile rubber crumb, (3) separating the nitrile rubber crumb from the serum in the coagulated nitrile rubber slurry, (4) mixing the nitrile rubber crumb into wash water to produce a nitrile rubber reslurry, (5) adjusting the pH of the nitrile rubber reslurry so as to be within the range of about 5 to about 8, and (6) separating the nitrile rubber crumb from the wash water of the nitrile rubber reslurry.

It is preferred for the antioxidant added in step (1) to be an alkylated aryl phosphite antioxidant. The alkylated aryl phosphite antioxidant will normally be a tris(alkylphenyl)

phosphite. It is more preferred to add a non-hydrolyzable antioxidant to the emulsion in addition to the alkylated aryl phosphite antioxidant. Thus, in step (1) an antioxidant mixture which is comprised of (a) an alkylated aryl phosphite antioxidant and (b) a non-hydrolyzable antioxidant will most preferably be added to the emulsion. The combination of the two antioxidants appears to have at least two positive effects. First, the presence of a non-hydrolyzable antioxidant assures that at least some antioxidant will exist in the coagulated polymer even if the alkylated aryl phosphite antioxidant is fully hydrolyzed. Second, the combination of the two antioxidants has an effect of hindering the hydrolysis of the alkylated aryl phosphite antioxidant. Thus, the increased concentration of alkylated aryl phosphite antioxidant (which has not been hydrolyzed) provides additional protection for the coagulated polymer against gelling. It is preferred for the non-hydrolyzable antioxidant to be a hindered phenol antioxidant. Tris(nonylphenyl)phosphite is a highly preferred alkylated aryl phosphite antioxidant and octadecyl-3,5-di-t-butyl-4-hydroxyhydrocinnamate is a highly preferred non-hydrolyzable antioxidant.

DETAILED DESCRIPTION OF THE INVENTION

The nitrile rubber containing emulsion used in the process of this invention can be synthesized by standard emulsion polymerization techniques. It is synthesized by the copolymerization of acrylonitrile and 1,3-butadiene in an aqueous emulsion under free radical polymerization conditions. The nitrile rubber in such emulsions accordingly contains repeat units which are derived from 1,3-butadiene monomer and acrylonitrile monomer. The repeat units which are derived from 1,3-butadiene monomer and acrylonitrile monomer differ from the monomers from which they were derived in that a double bond is consumed by the polymerization.

Nitrile rubbers normally contain from about 20 percent to about 45 percent repeat units which are derived from acrylonitrile and from about 55 percent to about 80 percent repeat units which are derived from 1,3-butadiene. Nitrile rubbers more typically contain from about 30 percent to about 36 percent repeat units which are derived from acrylonitrile and from about 64 percent to about 70 percent repeat units which are derived from 1,3-butadiene.

Carboxylated nitrile rubbers which contain repeat units which are derived from 1,3-butadiene, acrylonitrile and methacrylic acid can also be recovered from emulsions using the techniques of this invention. Such carboxylated nitrile rubbers are synthesized by the free radical terpolymerization of the 1,3-butadiene, acrylonitrile and methacrylic acid monomers under emulsion polymerization conditions. Carboxylated nitrile rubbers will typically have repeat units which are derived from about 55 weight percent to about 80 weight percent 1,3-butadiene monomer, from about 19 weight percent to about 44 weight percent acrylonitrile monomer, and from about 1 weight percent to about 20 weight percent methacrylic acid. The carboxylated nitrile rubbers of this invention will more typically have repeat units which are derived from about 64 weight percent to about 70 weight percent 1,3-butadiene monomer, from about 20 weight percent to about 32 weight percent acrylonitrile monomer, and from about 4 weight percent to about 10 weight percent methacrylic acid.

Conventional nitrile rubber latices typically have a solids content which is within the range of about 20 percent to about 30 percent. It is more typical for standard nitrile rubber latices to have a solids content which is within the range of about 25 percent to about 28 percent.

The emulsion polymerizations used in synthesizing such nitrile rubber emulsions used in the practice of this invention generally utilize a charge composition which is comprised of water, the monomers, an initiator and an emulsifier (soap). Such emulsion polymerizations can be conducted over a very wide temperature range from about 0° C. to as high as about 100° C. It is normally preferred for the emulsion polymerization to be carried out at a temperature which is within the range of about 5° C. to about 60° C. It is generally more preferred for the emulsion polymerization to be conducted at a temperature which is within the range of about 5° C. to about 30° C.

The ratio of bound monomers in the carboxylated nitrile rubber can vary from the monomer charge ratios utilized in the synthesis of the polymer due to differences in the polymerization rates of the monomers. Thus, the carboxylated nitrile rubber can have a different ratio of repeat units which are derived from the various monomers than was utilized in the monomer charge. The ratio of monomers utilized in the charge composition can vary and will, of course, vary with the ratio of bound monomers desired for the nitrile rubber being synthesized. However, the monomer charge composition will normally contain from about 30 to about 80 weight percent 1,3-butadiene, from about 20 to about 70 weight percent acrylonitrile, and from about 0 to about 20 weight percent methacrylic acid.

The charge composition used in the preparation of nitrile rubber emulsions will contain a substantial quantity of water. The ratio between the total amount of monomers present in the charge composition and water can range between about 0.2:1 and about 1.2:1. It is generally preferred for the ratio of monomers to water in the charge composition to be within the range of about 0.8:1 and about 1.1:1. For instance, it is very satisfactory to utilize a ratio of monomers to water in the charge composition of about 1:1.

The charge composition will also normally contain from about 0.5 phm (parts per hundred parts by weight of monomer) to about 6 phm of at least emulsifier. It is normally preferred for the emulsifier to be present in the polymerization medium at a level within the range of about 1 phm to about 5 phm. It is generally more preferred for the charge composition to contain from about 2 to about 4 phm of the emulsifier.

The emulsifiers used in the polymerization can be charged at the outset of the polymerization or may be added incrementally or by proportioning as the reaction proceeds. Generally, anionic emulsifier systems provide good results; however, any of the general types of anionic, cationic or nonionic emulsifiers may be employed in the polymerization.

Among the anionic emulsifiers that can be employed in emulsion polymerizations include fatty acids and their alkali metal soaps such as caprylic acid, capric acid, pelargonic acid, lauric acid, undecylic acid, myristic acid, palmitic acid, margaric acid, stearic acid, arachidic acid and the like; amine soaps of fatty acids such as those formed from ammonia, mono- and dialkyl amines, substituted hydrazines, guanidine and various low molecular weight diamines; chain-substituted derivatives of fatty acids such as those having alkyl substituents; napthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins and other hydrocarbon mixtures, sulfuric esters of aliphatic and aromatic alcohols having intermediate linkages, such as ether, ester or amide groups such as alkylbenzyl (polyethyleneoxy) alcohols, the sodium salt of tridecyl ether sulfate; alkane sulfonates, esters and salts, such as alkylchlorosulfonates with the general formula $RSO_2Cl$, wherein R is an alkyl group having from 10 to 20 carbon atoms and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC$—$CH_2$—$SO_3H$, wherein R is an alkyl group having from 1 to 20 carbon atoms such as dialkyl sulfosuccinates; ester salts with the general formula:

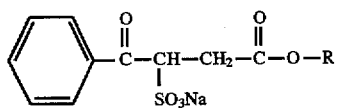

wherein R is an alkyl group having from 1 to 20 carbon atoms; alkaryl sulfonates in which the alkyl groups contain preferably from 10 to 20 carbon atoms, e.g. dodecylbenzenesulfonates, such as sodium dodecylbenzenesulfonates; alkyl phenol sulfonates; sulfonic acids and their salts such as acids with the formula $RSO_3Na$, wherein R is an alkyl and the like; sulfonamides; sulfamido methylenesulfonic acids; rosin acids and their soaps; sulfonates derivatives of rosin and rosin oil; and lignin sulfonates and the like.

Rosin acid soap has been used with good success at a concentration of about 5 percent by weight in the initial charge composition used in the synthesis of carboxylated elastomers. Of rosin acid, about 90 percent are isometric with abletic acid and the other 10 percent is a mixture of dehydro abietic acid and dihydro abietic acid.

The polymerization can be initiated using free radical catalysts, ultraviolet light or radiation. To ensure a satisfactory polymerization rate, uniformity and a controllable polymerization, free radical initiators are generally used. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as butylazo-2-cyanopropane, dimethyl azodiisobutyrate, azodiisobutyronitrile, 2-t-butylazo-1-cyanocyclohexane, 1-t-amylazo-1-cyanocyclohexane and the like; the various alkyl perkatals, such as 2,2-bis-(t-butylperoxy)butane, ethyl 3,3-bis(t-butylperoxy) butyrate, 1,1-di-(t-butyl-peroxy) cyclohexane and the like. Cumene hydroperoxide is a highly preferred initiator.

After the desired degree of monomer conversion has been attained, a conventional shortstopping agent, such as hydroquinone, can be added to the polymerization medium to end the polymerization. The polymerization will typically be allowed to continue until a high level conversion has been achieved. In most cases, the monomer conversion reached will be at least about 75 percent with monomer conversions of at least about 80 percent being preferred.

After the polymerization has been shortstopped, it is generally desirable to strip unreacted monomers from the emulsion. This can be accomplished using conventional techniques such as steam-stripping. After any stripping operations have been completed, the antioxidant can be added to the nitrile rubber containing emulsion to produce a stabilized nitrile rubber.

Virtually any type of antioxidant can be utilized for this purpose. For instance, any antioxidant can be used which is capable of rendering the polymer less susceptible to oxidative attack by chemically interrupting the autoxidation process by which the polymer is oxidatively degraded. More specifically, the antioxidant can be a chain-breaking antioxidant, a peroxide-decomposing antioxidant, an ultraviolet screening agent, a triplet quencher or a metal deactivator. However, it is preferred for the antioxidant to be an alkylated aryl phosphite. It is more preferred for the antioxidant to be a mixture of (a) an alkylated aryl phosphite antioxidant and (b) a non-hydrolyzable antioxidant.

The alkylated aryl phosphite antioxidants which can be used are of the structural formula:

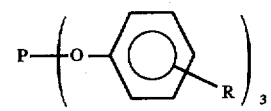

wherein R represents an alkyl group containing from 1 to about 30 carbon atoms. It is preferred for the alkyl group to contain from about 4 to about 20 carbon atoms and it is most preferred for the alkyl group to contain from about 6 to about 12 carbon atoms. Tris(nonylphenyl)phosphite is a highly preferred alkylated aryl phosphite antioxidant which is commercially available from a variety of sources.

The hindered phenol antioxidants which can be employed are normally alkyl substituted phenols of the structural formula:

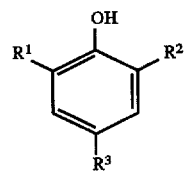

wherein $R^1$ and $R^2$ represent alkyl groups containing from 1 to about 10 carbon atoms and wherein $R^3$ represents a hydrogen atom or an organic radical which contains from about 1 to about 30 carbon atoms. It is normally preferred for $R^1$ and $R^2$ to represent tertiary-alkyl groups containing from 4 to about 10 carbon atoms and for $R^3$ to represent an organic radical of the formula —$CH_2$—$CH_2$—$COOR^4$ wherein $R^4$ represents an alkyl group containing from about 12 to about 24 carbon atoms. Thiodiethylene bis(3,5-di-t-butyl-4-hydroxy) hydrocinnamate and octadecyl 3-(3,5-di-t-butyl-4-hydroxyphenyl)propionate are highly preferred hindered phenol antioxidants.

Normally from about 0.25 phm to about 3 phm of the antioxidant will be added to provide the nitrile rubber with the desired degree of stability. It is generally preferred for about 0.5 phm to 2 phm of the antioxidant to be added in step (1). In most cases, it is more preferred for the antioxidant to be present at a level which is within the range of about 1 phm to about 1.5 phm.

After the antioxidant has been added in step (1), the stabilized nitrile rubber emulsion is coagulated using a conventional salt/acid coagulation procedure. In other words, a salt and an acid are added to the stabilized nitrile emulsion to cause coagulation. The coagulation is accomplished by adding to the latex at least one strong inorganic acid and a salt. Coagulation aids can also be employed in coagulation of the nitrile rubber emulsion. The strong inorganic acid will typically be sulfuric acid, hydrochloric acid or nitric acid with sulfuric acid being preferred. A wide variety of salts can be employed. Some representative examples of salts which can be used include sodium chloride, potassium chloride, calcium chloride, aluminum sulfate, magnesium sulfate, and quaternary ammonium salts. The amount of salt and acid needed to cause coagulation will vary with the specific emulsion and with the type of salt utilized. Calcium chloride is a highly preferred salt and will normally be added in an amount which is within the range of about 13 phr to about 40 phr.

After the nitrile rubber emulsion has been coagulated, a coagulated nitrile rubber slurry is formed. The coagulated nitrile rubber slurry is comprised of serum and nitrile rubber crumb. The serum is essentially the aqueous phase with the rubber crumb being the solid phase. The serum is, of course, comprised of water, emulsifier, acids, salts and other water-soluble residual compounds.

The coagulated nitrile rubber slurry is typically transferred to a conversion tank in order to complete the coagulation process. The nitrile rubber crumb is then filtered through a shaker screen which collects the nitrile rubber crumb and deposits it within a reslurry tank. Washing is typically employed to remove excess soap and/or electrolyte from the nitrile rubber. In the reslurry tank, the nitrile rubber crumb is washed and agitated in fresh wash water to produce a nitrile rubber reslurry.

The pH of the nitrile rubber reslurry is then adjusted so as to be within the range of about 5 to about 8. This neutralization step is accomplished by the addition of a base. Numerous bases known to those of skill in the art may be utilized, including calcium hydroxide, magnesium hydroxide, potassium hydroxide and sodium hydroxide. The pH of the nitrile rubber reslurry will preferably be adjusted to be within the range of about 5.5 to about 7.5 and will most preferably be adjusted to be within the range of about 6 to about 7.

The serum from the shaker screen is then typically recycled back to the coagulator, permitting efficient use of the coagulants. The nitrile rubber crumb from the reslurry tank then normally passes over a second shaker screen and is directed to an expeller, in which the polymer is dewatered. The expeller typically consists of a screw which transports the rubber down a shaft of the expeller under increasingly constricting conditions. The barrel of the expeller is lined lengthwise with narrow grooves, the width of which decreases as the rubber moves through the expeller.

The water is squeezed out through the grooves while the rubber advances to an open-ended cone located at the far end of the barrel. The cone provides a back-pressure for the dewatering screw. The dewatering force can be controlled by adjusting the setting of the cone. This adjustment can vary with different types of nitrile rubber and can be altered during a finishing run to attain the desired moisture content. The moisture content of the rubber exiting the expeller is typically in the range of about 7 weight percent to about 10 weight percent.

The dewatered rubber then typically passes through a small port in the cone at the end of the expeller shaft as a long strand. This strand of nitrile rubber can be chopped into small pieces by rotating knives located near the opening of the cone. These pieces of nitrile rubber are then typically directed to a Jeffery grinder, where the rubber is ground to a smaller size to facilitate drying.

From the Jeffery grinder, the nitrile rubber is air-conveyed to a cyclone, where it subsequently falls onto a metal apron and proceeds through an apron drier. The cyclone functions as a knock-out vessel that separates the rubber from the air. Consequently, the rubber falls onto the apron in a uniform, dispersed manner. The apron drier is typically a single-pass drier containing a series of heated zones which may each be set to specified temperatures. Hot air is directed through each zone at the specified temperature and removes the moisture from the rubber. The maximum drying temperature is somewhat limited because the heat history of the rubber significantly affects ultimate properties. Both the zone temperatures and the apron speed may be varied to adjust the drying conditions within the apron dryer. The moisture content of the finished rubber is preferably less than about 1 percent, and more preferably below about 0.7 percent. When the rubber exits the apron dryer, it is allowed to cool and is carried to a baler. The dried rubber is typically weighed, pressed into 55 pound (20.5 kg) bales and wrapped in film. The wrapped bales are typically either packed into returnable containers or cardboard boxes.

The nitrile rubbers produced by the process of the present invention can be used to produce numerous finished products. For example, it is envisioned that these rubbers may be used for traditional applications, such as the manufacture of gaskets, seals, adhesives, fiber binders, protective and decorative coatings, foams, paper coatings, carpet and upholstery, concrete and bitumen modifiers, thread and textile modifiers. In addition, more recent applications such as protein immobilizers, electronic applications, such as photoresists for circuit boards, in batteries, conductive paints, and as compounds in molecular electronic devices. The nitrile rubber is typically cured in the processes used in manufacturing these products.

The practice of this invention is further illustrated by the following examples which are intended to be representative rather than restrictive of the scope of the subject invention. Unless indicated otherwise, all parts and percentages are given by weight.

COMPARATIVE EXAMPLE 1

In this experiment, 1.5 percent of tris(nonylphenol) phosphite antioxidant was added to a nitrile rubber latex prior to coagulation. Then, the nitrile rubber latex was coagulated and the rubber was dewatered and dried. The dry nitrile rubber was determined to contain 0.04 percent unhydrolyzed tris(nonylphenol) phosphite antioxidant and 0.54 percent hydrolyzed tris(nonylphenol) phosphite antioxidant.

COMPARATIVE EXAMPLE 2

The procedure described in Comparative Example 1 was repeated in this experiment. However, in this experiment, the dry nitrile rubber was determined to contain only 0.01 percent unhydrolyzed tris(nonylphenol) phosphate antioxidant and 0.77 percent hydrolyzed tris(nonylphenol) phosphite antioxidant.

COMPARATIVE EXAMPLE 3

The procedure described in Comparative Example 1 was repeated in this experiment. However, in this experiment, the dry nitrile rubber was determined to contain only 0.02 percent unhydrolyzed tris(nonytphenol) phosphite antioxidant and 2.20 percent hydrolyzed tris(nonylphenol) phosphite antioxidant.

EXAMPLE 4

In this experiment, 0.8 percent of tris(nonylphenol) phosphite antioxidant and 0.2 percent of Ultranox™ 276 octadecyl 3,5-di-t-butyl-4-hydroxyhydrocinnemate antioxidant was added to a nitrile rubber latex prior to coagulation. Then, the nitrile rubber latex was coagulated and the rubber was dewatered and dried using the same procedure as was employed in Comparative Examples 1–3. The dry nitrile rubber was determined to contain 0.31 percent unhydrolyzed tris(nonylphenol) phosphite antioxidant and 0.71 percent hydrolyzed tris(nonylphenol) phosphite antioxidant. Thus, over seven times more unhydrolyzed tris(nonylphenol) phosphite antioxidant was present in the dry nitrile rubber than was present in any of the of the rubbers recovered in Comparative Examples 1–3. This is very surprising, particularly in light of the fact that much less of the tris (nonylphenol) phosphite antioxidant was initially added to the latex.

EXAMPLE 5

The procedure described in Example 4 was repeated in this experiment. However, in this experiment, the dry nitrile rubber was determined to contain 0.37 percent unhydrolyzed tris(nonylphenol) phosphite antioxidant and 0.49 percent hydrolyzed tris(nonylphenol) phosphite antioxidant. Thus, over nine times more unhydrolyzed tris(nonylphenol) phosphite antioxidant was present in the dry nitrile rubber than was present in any of the rubbers recovered in Comparative Examples 1–3.

This experiment and Example 4 show that the presence of the octadecyl 3,5-di-t-butyl-4-hydroxyhydrocinnemate antioxidant greatly increased the level of unhydrolyzed tris (nonylphenol) phosphite antioxidant present in the dry nitrile rubber.

Examples 6 and Comparative Example 7

In this experiment, 0.2 percent of Ultranox™ 276 octadecyl 3,5-di-t-butyl-4-hydroxyhydrocinnemate antioxidant was added to a nitrile rubber latex prior to coagulation. The nitrile rubber latex was subsequently coagulated by the addition of calcium carbonate and sulfuric acid to the latex. In one case (Example 6), the pH of the nitrile rubber slurry in the reslurry tank was adjusted by the addition of sodium hydroxide. In the other case (Comparative Example 7), the pH of the nitrile rubber in the reslurry tank was not adjusted. The nitrile rubbers were then dewatered and dried.

The nitrile rubbers recovered were then aged at a temperature of 70° C. for up to 28 days. The Mooney ML4 viscosities of the nitrile rubbers were measured and recorded as the rubber samples aged. The results of this study are shown in Table I.

TABLE I

MOONEY ML4 VISCOSITY VERSUS AGING TIME

| Aging Time | Example 6 | Comp. Example 7 |
|---|---|---|
| 0 days | 66 | 69 |
| 3 days | 68 | 73 |
| 5 days | 67 | 72 |
| 7 days | 67 | 72 |
| 14 days | 67 | 75 |
| 21 days | 66 | 76 |
| 28 days | 69 | 80 |

EXAMPLES 8–12 AND COMPARATIVE EXAMPLE 13

In this series of experiments, 2 percent of tris (nonylphenyl) phosphite antioxidant was added to a nitrile rubber latex prior to coagulation. The nitrile rubber latex was subsequently coagulated by the addition of a polyquaternary ammonium salt and sulfuric acid to the latex. In Examples 8–12, the pH of the nitrile rubber slurry in the reslurry tank was adjusted by the addition of sodium hydroxide to the ph shown in Table II. In Comparative Example 13, the pH of the nitrile rubber in the reslurry tank was not adjusted. The nitrile rubbers were then dewatered and dried.

The nitrile rubbers recovered were then compounded with 5 phr (parts per 100 parts of rubber) of zinc oxide, 1 phr of Captax® 2-mercaptobenzothiazole accelerator, 0.5 phr of methyl zimate and 2 phr of sulfur. After being compounded, the nitrile rubber samples were subjected by rheometer testing at 280° F. (138° C.) to determine cure characteristics.

TABLE II

| Example | pH | TC50[1] | TC90[2] |
|---|---|---|---|
| 8 | 3.0 | 5.8 min. | 7.8 min. |
| 9 | 4.5 | 5.6 min. | 7.7 min. |
| 10 | 6.0 | 5.3 min. | 7.5 min. |
| 11 | 7.0 | 4.9 min. | 7.3 min. |
| 12 | 8.0 | 5.2 min. | 7.4 min. |
| 13 | — | 7.2 min. | 8.8 min. |

[1]TC50 is the time in minutes taken to reach 50 percent of the maximum torque.
[2]TC50 is the time in minutes taken to reach 90 percent of the maximum torque.

As can be seen from Table II, cure times were minimized when the pH of the reslurry was adjusted to 7.0. Thus, it appears to be desirable to add a sufficient amount of base to the reslurry to make it as neutral as possible.

While certain representative embodiments and details have been shown for the purpose of illustrating the subject invention, it will be apparent to those skilled in this art that various changes and modifications can be made Without departing from the scope of the present invention.

What is claimed is:

1. An improved method for the recovery of nitrile rubber from a nitrile rubber containing emulsion, said method comprising the steps of (1) adding an antioxidant to the nitrile rubber containing emulsion to-produce a stabilized nitrile rubber emulsion, (2) adding a salt and an acid to said stabilized nitrile rubber emulsion to produce a coagulated nitrile rubber slurry, wherein said coagulated nitrile rubber slurry is comprised of serum and nitrile rubber crumb, (3) separating the nitrile rubber crumb from the serum in the coagulated nitrile rubber slurry, (4) mixing the nitrile rubber crumb into wash water to produce a nitrile rubber reslurry, (5) adjusting the pH of the nitrile rubber reslurry so as to be within the range of about 5 to about 8 and (6) separating the nitrile rubber crumb from the wash water of the nitrile rubber reslurry.

2. A method as specified in claim 1 wherein the pH of the nitrile rubber reslurry is adjusted in step (5) by the addition of a base.

3. A method as specified in claim 2 wherein the pH is adjusted in step (5) to be within the range of about 5.5 to about 7.5.

4. A method as specified in claim 3 wherein the nitrile rubber crumb is separated from the wash water of the nitrile rubber reslurry in step (6) with a screen.

5. A method as specified in claim 4 wherein the screen is a shaker screen.

6. A method as specified in claim 3 which further comprises dewatering and subsequently drying the nitrile rubber crumb separated from the wash water of the nitrile rubber reslurry in step (6).

7. The dried nitrile rubber made by the process specified in claim 6.

8. The nitrile rubber made by the process specified in claim 1.

9. A method as specified in claim 2 wherein the antioxidant is an alkylated aryl phosphite antioxidant.

10. A method as specified in claim 9 wherein the alkylated aryl phosphite antioxidant is of the structural formula:

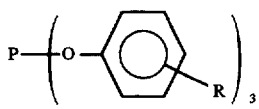

wherein R represents an alkyl group containing from 1. to about 30 carbon atoms.

11. A method as specified in claim 10 wherein R represents an alkyl group containing from about 4 to about 20 carbon atoms.

12. A method as specified in claim 10 wherein R represents an alkyl group containing from about 6 to about 12 carbon atoms.

13. A method as specified in claim 10 wherein the antioxidant is a mixture of (a) an alkylated aryl phosphite antioxidant and (b) a hindered phenol antioxidant.

14. A method as specified in claim 13 wherein the hindered phenol antioxidant is of the structural formula:

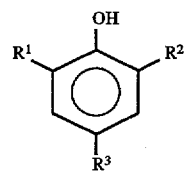

wherein $R^1$ and $R^2$ represent alkyl groups containing from 1 to about 10 carbon atoms and wherein $R^3$ represents a hydrogen atom or an organic radical which contains from about 1 to about 30 carbon atoms.

15. A method as specified in claim 14 wherein $R^1$ and $R^2$ represent tertiary-alkyl groups containing from 4 to about 10 carbon atoms and wherein $R^3$ represents an organic radical of the formula —$CH_2$—$CH_2$—$COOR^4$, wherein $R^4$ represents an alkyl group containing from about 12 to about 24 carbon atoms.

16. A method as specified in claim 13 wherein the alkylated aryl phosphite antioxidant is tris(nonylphenyl) phosphite, and wherein the hindered phenol antioxidant is octadecyl 3-(3,5-di-t-butyl-4-hydroxyphenyl)propionate.

17. A method as specified in claim 2 wherein the pH is adjusted in step (5) to be within the range of about 6 to about 7.

18. A method as specified in claim 17 wherein the base is selected from the group consisting of calcium hydroxide, magnesium hydroxide and sodium hydroxide.

19. A method as specified in claim 16 wherein the base is sodium hydroxide and wherein the pH is adjusted in step (5) to be within the range of about 6 to about 7.

* * * * *